United States Patent
Medlock et al.

(10) Patent No.: US 9,046,932 B2
(45) Date of Patent: Jun. 2, 2015

(54) SYSTEM AND METHOD FOR INPUTTING TEXT INTO ELECTRONIC DEVICES BASED ON TEXT AND TEXT CATEGORY PREDICTIONS

(75) Inventors: Benjamin William Medlock, London (GB); Jonathan Paul Reynolds, London (GB)

(73) Assignee: TOUCHTYPE LTD, London (GB)

( * ) Notice: Subject to any disclaimer, the term of this patent is extended or adjusted under 35 U.S.C. 154(b) by 362 days.

(21) Appl. No.: 13/501,087

(22) PCT Filed: Oct. 11, 2010

(86) PCT No.: PCT/GB2010/001898
§ 371 (c)(1),
(2), (4) Date: Apr. 9, 2012

(87) PCT Pub. No.: WO2011/042710
PCT Pub. Date: Apr. 14, 2011

(65) Prior Publication Data
US 2012/0197825 A1 Aug. 2, 2012

(30) Foreign Application Priority Data

Oct. 9, 2009 (GB) .................................. 0917753.6

(51) Int. Cl.
*G06F 17/00* (2006.01)
*G06F 3/023* (2006.01)
*G06N 3/08* (2006.01)

(52) U.S. Cl.
CPC .............. *G06F 3/0237* (2013.01); *G06N 3/084* (2013.01)

(58) Field of Classification Search
CPC .. G06N 5/04; G06Q 30/0255; G06Q 30/0254
See application file for complete search history.

(56) References Cited

U.S. PATENT DOCUMENTS

| 5,467,425 A | 11/1995 | Lau et al. |
| 5,477,451 A | 12/1995 | Brown et al. |
| 5,612,690 A | 3/1997 | Levy |
| 5,671,426 A | 9/1997 | Armstrong, III |
| 5,680,511 A | 10/1997 | Baker et al. |
| 5,768,603 A | 6/1998 | Brown et al. |

(Continued)

FOREIGN PATENT DOCUMENTS

| CN | 101496036 A | 7/2009 |
| EP | 1724692 A2 | 11/2006 |
| EP | 2088536 A | 8/2009 |
| GB | 200622248 A | 8/2006 |
| WO | 2008116843 A2 | 10/2008 |
| WO | 2008120033 A1 | 10/2008 |

OTHER PUBLICATIONS

Trnka et al. "Topic Modeling in Fringe Word Prediction for AAC", IUI, 2006, pp. 8.*

(Continued)

*Primary Examiner* — Li-Wu Chang
(74) *Attorney, Agent, or Firm* — Baker & Hostetler LLP (57) ABSTRACT

The present invention relates generally to a system and method for text prediction and, in particular, a system and method for the adaptive weighting of text predictions. The present invention provides a modular language model-based text prediction system for the adaptive weighting of text prediction components and a method for doing so. The system uses category predictions, generated by a timed aggregated perceptron classifier, to weight, using a weighting module, text predictions generated by a text prediction engine comprising at least one predictor.

19 Claims, 3 Drawing Sheets

(56) References Cited

U.S. PATENT DOCUMENTS

| | | |
|---|---|---|
| 5,805,832 A | 9/1998 | Brown et al. |
| 5,805,911 A | 9/1998 | Miller |
| 5,806,021 A | 9/1998 | Chen et al. |
| 5,896,321 A | 4/1999 | Miller et al. |
| 5,952,942 A | 9/1999 | Balakrishnan et al. |
| 5,963,671 A | 10/1999 | Comerford et al. |
| 6,009,444 A | 12/1999 | Chen |
| 6,011,554 A | 1/2000 | King et al. |
| 6,052,657 A | 4/2000 | Yamron et al. |
| 6,054,941 A | 4/2000 | Chen |
| 6,104,989 A | 8/2000 | Kanevsky et al. |
| 6,125,342 A | 9/2000 | Selesky |
| 6,182,027 B1 | 1/2001 | Nasukawa et al. |
| 6,204,848 B1 | 3/2001 | Nowlan et al. |
| 6,219,632 B1 | 4/2001 | Schumacher et al. |
| 6,236,958 B1 | 5/2001 | Lange et al. |
| 6,253,169 B1 | 6/2001 | Apte et al. |
| 6,275,792 B1 | 8/2001 | Lewis |
| 6,286,064 B1 | 9/2001 | King et al. |
| 6,307,548 B1 | 10/2001 | Flinchem et al. |
| 6,307,549 B1 | 10/2001 | King et al. |
| 6,321,192 B1 | 11/2001 | Houchin et al. |
| 6,327,561 B1 | 12/2001 | Smith et al. |
| 6,362,752 B1 | 3/2002 | Guo et al. |
| 6,377,965 B1 | 4/2002 | Hachamovitch et al. |
| 6,393,399 B1 | 5/2002 | Even |
| 6,460,015 B1 | 10/2002 | Hetherington et al. |
| 6,484,136 B1 | 11/2002 | Kanevsky et al. |
| 6,490,549 B1 | 12/2002 | Ulicny et al. |
| 6,519,557 B1 | 2/2003 | Emens et al. |
| 6,573,844 B1 | 6/2003 | Venolia et al. |
| 6,625,600 B2 | 9/2003 | Lyudovyk et al. |
| 6,671,670 B2 | 12/2003 | Levin et al. |
| 6,724,936 B1 | 4/2004 | Riemer |
| 6,813,616 B2 | 11/2004 | Simpson et al. |
| 6,911,608 B2 | 6/2005 | Levy |
| 6,925,433 B2 | 8/2005 | Stensmo |
| 6,963,831 B1 | 11/2005 | Epstein |
| 6,965,856 B1 | 11/2005 | Stuermer |
| 6,993,476 B1 | 1/2006 | Dutta et al. |
| 7,075,520 B2 | 7/2006 | Williams |
| 7,092,870 B1 | 8/2006 | Chen et al. |
| 7,098,896 B2 | 8/2006 | Kushler et al. |
| 7,129,932 B1 | 10/2006 | Klarlund et al. |
| 7,175,438 B2 | 2/2007 | Levy |
| 7,187,365 B2 | 3/2007 | Harman |
| 7,222,067 B2 | 5/2007 | Glushnev et al. |
| 7,251,367 B2 | 7/2007 | Zhai |
| 7,269,546 B2 | 9/2007 | Stensmo |
| 7,366,666 B2 | 4/2008 | Balchandran et al. |
| 7,426,505 B2 | 9/2008 | Simpson et al. |
| 7,453,439 B1 | 11/2008 | Kushler et al. |
| 7,475,010 B2 | 1/2009 | Chao |
| 7,487,461 B2 | 2/2009 | Zhai et al. |
| 7,562,016 B2 | 7/2009 | Balchandran et al. |
| 7,580,829 B2 | 8/2009 | James et al. |
| 7,610,189 B2 | 10/2009 | Mackie |
| 7,610,191 B2 | 10/2009 | Gao et al. |
| 7,706,616 B2 | 4/2010 | Kristensson et al. |
| 7,720,682 B2 | 5/2010 | Stephanick et al. |
| 7,750,891 B2 | 7/2010 | Stephanick et al. |
| 7,809,575 B2 | 10/2010 | Ativanichayaphong et al. |
| 7,814,088 B2 | 10/2010 | Simpson et al. |
| 7,843,427 B2 | 11/2010 | Ording et al. |
| 7,912,700 B2 | 3/2011 | Bower et al. |
| 7,920,132 B2 | 4/2011 | Longe et al. |
| 7,996,211 B2 | 8/2011 | Gao et al. |
| 8,010,343 B2 | 8/2011 | Agapi et al. |
| 8,032,358 B2 | 10/2011 | Helletzgruber et al. |
| 8,036,878 B2 | 10/2011 | Assadollahi |
| 8,073,698 B2 | 12/2011 | Ativanichayaphong et al. |
| 8,074,172 B2 | 12/2011 | Kocienda et al. |
| 8,117,144 B2 | 2/2012 | Angell et al. |
| 8,136,050 B2 | 3/2012 | Sacher et al. |
| 8,200,487 B2 | 6/2012 | Peters et al. |
| 8,225,203 B2 | 7/2012 | Unruh |
| 8,232,973 B2 | 7/2012 | Kocienda et al. |
| 8,289,283 B2 | 10/2012 | Kida et al. |
| 8,516,367 B2 | 8/2013 | Archer |
| 8,713,432 B2 | 4/2014 | Assadollahi |
| 8,812,972 B2 | 8/2014 | Bangalore |
| 2002/0045463 A1 | 4/2002 | Chen et al. |
| 2002/0077808 A1 | 6/2002 | Liu et al. |
| 2002/0091520 A1 | 7/2002 | Endo et al. |
| 2002/0126097 A1 | 9/2002 | Savolainen |
| 2002/0188448 A1 | 12/2002 | Goodman et al. |
| 2002/0196163 A1 | 12/2002 | Bradford et al. |
| 2003/0011574 A1 | 1/2003 | Goodman |
| 2003/0023420 A1 | 1/2003 | Goodman |
| 2003/0046073 A1 | 3/2003 | Mori et al. |
| 2003/0073451 A1 | 4/2003 | Kraft |
| 2003/0093263 A1 | 5/2003 | Chen et al. |
| 2003/0182279 A1 | 9/2003 | Willows |
| 2003/0234821 A1 | 12/2003 | Pugliese |
| 2004/0083198 A1 | 4/2004 | Bradford et al. |
| 2004/0136564 A1 | 7/2004 | Roeber et al. |
| 2004/0153975 A1 | 8/2004 | Williams et al. |
| 2004/0201607 A1 | 10/2004 | Mulvey et al. |
| 2004/0243393 A1 | 12/2004 | Wang |
| 2005/0044495 A1 | 2/2005 | Lee et al. |
| 2005/0060138 A1 | 3/2005 | Wang et al. |
| 2005/0190970 A1 | 9/2005 | Griffin |
| 2005/0283724 A1 | 12/2005 | Griffin |
| 2006/0036428 A1 | 2/2006 | Ramsey |
| 2006/0047498 A1 | 3/2006 | Fux et al. |
| 2006/0142997 A1 | 6/2006 | Jakobsen et al. |
| 2006/0206313 A1 | 9/2006 | Xu et al. |
| 2006/0247915 A1 | 11/2006 | Bradford et al. |
| 2006/0265208 A1 | 11/2006 | Assadollahi |
| 2006/0265648 A1 | 11/2006 | Rainisto et al. |
| 2006/0274051 A1 | 12/2006 | Longe et al. |
| 2006/0290535 A1 | 12/2006 | Thiesson et al. |
| 2007/0016572 A1 | 1/2007 | Bates et al. |
| 2007/0033002 A1 | 2/2007 | Dymetman et al. |
| 2007/0046641 A1 | 3/2007 | Lim |
| 2007/0074131 A1 | 3/2007 | Assadollahi |
| 2007/0076862 A1 | 4/2007 | Chatterjee et al. |
| 2007/0094024 A1 | 4/2007 | Kristensson et al. |
| 2007/0157122 A1 | 7/2007 | Williams |
| 2008/0040099 A1 | 2/2008 | Wu et al. |
| 2008/0076472 A1 | 3/2008 | Hyatt |
| 2008/0077406 A1 | 3/2008 | Ganong |
| 2008/0120102 A1* | 5/2008 | Rao .............................. 704/235 |
| 2008/0126075 A1 | 5/2008 | Thorn |
| 2008/0162113 A1 | 7/2008 | Dargan |
| 2008/0189605 A1 | 8/2008 | Kay et al. |
| 2008/0195374 A1 | 8/2008 | Holubar et al. |
| 2008/0195571 A1 | 8/2008 | Furuuchi et al. |
| 2008/0281583 A1 | 11/2008 | Slothouber et al. |
| 2008/0282154 A1 | 11/2008 | Nurmi |
| 2008/0285857 A1 | 11/2008 | Sharan et al. |
| 2008/0310723 A1 | 12/2008 | Manu et al. |
| 2008/0312910 A1 | 12/2008 | Zhang |
| 2009/0009367 A1 | 1/2009 | Hirshberg |
| 2009/0019002 A1 | 1/2009 | Boulis |
| 2009/0058690 A1 | 3/2009 | Scott |
| 2009/0106695 A1 | 4/2009 | Perry et al. |
| 2009/0193334 A1 | 7/2009 | Assadollahi |
| 2009/0210214 A1 | 8/2009 | Qian et al. |
| 2009/0249198 A1 | 10/2009 | Davis et al. |
| 2009/0284471 A1 | 11/2009 | Longe et al. |
| 2010/0017393 A1 | 1/2010 | Broicher et al. |
| 2010/0121870 A1 | 5/2010 | Unruh et al. |
| 2010/0161318 A1 | 6/2010 | Lowles et al. |
| 2010/0171700 A1 | 7/2010 | Sharan et al. |
| 2011/0029862 A1 | 2/2011 | Scott et al. |
| 2011/0047456 A1 | 2/2011 | Sharan et al. |
| 2011/0074685 A1 | 3/2011 | Causey et al. |
| 2011/0179032 A1 | 7/2011 | Ceusters et al. |

(56) References Cited

U.S. PATENT DOCUMENTS

| | | |
|---|---|---|
| 2011/0202836 A1 | 8/2011 | Badger et al. |
| 2012/0010875 A1 | 1/2012 | Helletzgruber et al. |
| 2012/0167009 A1 | 6/2012 | Davidson et al. |

OTHER PUBLICATIONS

Lesher et al. "Domain-specific word prediction for augmentative communication", RESNA '02 Annual Conference, 2002, pp. 3.*

Florian et al. "Dynamic nonlocal language modeling via hierarchical topic-based Adaptation", ACL'99, pp. 167-174.*

Duda et al.; "Pattern Classification"; $2^{nd}$ edition Chapter 10; 2000; 69 pages.

Li et al.; "Using Uneven Margins SVM and Perception for Information Extraction"; Proceedings of the $9^{th}$ Conference on Computational Natural Language Learning; Jun. 2005; p. 72-79.

* cited by examiner

Figure 1: Adaptive Prediction Architecture

Figure 2: Adaptive Prediction Example Instantiation

Figure 3

SYSTEM AND METHOD FOR INPUTTING TEXT INTO ELECTRONIC DEVICES BASED ON TEXT AND TEXT CATEGORY PREDICTIONS

The present invention relates generally to a system and method for inputting text into electronic devices. In particular, the invention relates to a system and method for the adaptive weighting of text predictions.

There currently exists a wide range of text input techniques for use with electronic devices, for example, QWERTY-style keyboards for text input into a computer or laptop, handwriting recognition in the PDA market, alphabetic character entry using a 9-digit keypad for mobile phone devices, speech recognition text input systems for both standard and mobile computational devices, and touch-screen devices.

In the case of mobile phone technology there are a number of existing text input technologies. Notable examples include Tegic Communications' 'T9', Motorola's 'iTap', Nuance's 'XT9', 'eZiType' and 'eZiText', Blackberry's 'SureType', KeyPoint Technology's 'AdapTxt' and CooTek's 'TouchPal'. These techniques comprise predominantly character-based text input and utilise some form of text prediction (or disambiguation) technology. In each of the identified models, a dictionary (or plurality of dictionaries) of allowable terms is maintained and, given a particular input sequence, the system chooses a legitimate term (or set of terms) from the dictionary and presents it to the user as a potential completion candidate. The basic dictionary can be augmented with new terms entered by the user, limited by the amount of device memory available.

In these systems, completions are ordered on the basis of usage frequency statistics and in some cases (e.g. eZiText, AdapTxt, TouchPal) using immediate lexical context.

The present invention represents a significant enhancement over systems in which text predictions are ordered solely on the basis of recency or frequency. It allows the ordering of predictions to be influenced by high-level characteristics of the text being generated, e.g. topic, genre or authorship.

The present invention therefore provides for a more accurate ordering, by a system, of text predictions generated by the system, thereby reducing the user labour element of text input (because the user is less likely to have to scroll through a list of predicted terms, or enter additional characters, to find their intended term).

In accordance with the present invention there is provided a system which employs a machine learning technique, classification, to make real-time category predictions for sections of text entered by a user. The system uses the category predictions to reorder and/or select the text predictions generated by a text prediction engine. The generated text predictions can then be displayed for user selection to input text into an electronic device.

Reordering the text predictions by category predictions offers the advantage of placing predictions that are more likely to be relevant to the current textual topic/genre etc. at the top of a list for display and user selection, thereby facilitating user text input. The category predictions can be graded to give broad category predictions and finer category predictions within those broad categories. For example, sport as a broad category can be split into any number of sub-categories, and these sub-categories can be further divided. If a sub-category of sport is football, this sub-category could be split into further sub-categories such as football clubs, players, managers etc. The system of the present invention can therefore predict accurately, from the user inputted text, a number of categories that this text relates to. The system can then hone the text predictions generated by a text prediction engine (that generates, preferably, context based predictions) by decreasing the probabilities of predictions which are unlikely to occur given the category predictions for the user inputted text.

In accordance with the present invention there is provided a system for generating text input in a computing device, the system comprising a text prediction engine comprising at least one predictor and configured to receive text input into the device by a user and to generate text predictions using the at least one predictor, a classifier configured to receive the input text and to generate at least one text category prediction, and a weighting module configured to receive the text predictions and the at least one category prediction and to weight the text predictions by the category predictions to generate new text predictions for presentation to the user.

Preferably, the at least one predictor is trained from a text source. The system may comprise a plurality of predictors, each predictor being trained by a separate text source. Preferably, the plurality of predictors generate concurrently text predictions.

In an embodiment of the invention, the system further comprises a Feature Vector Generator which is configured to generate a feature vector representing the text input into the device by a user by extracting features from the input text, calculating the term frequency-inverse document frequency for each feature in the text input, and normalising the resulting vector to unit length. The Feature Vector Generator is preferably further configured to generate at least one feature vector for the text source or each of the separate text sources by extracting a set of features from the text source, calculating the term frequency-inverse document frequency for each feature in the text source, and normalising the resulting vectors to unit length.

In a preferred embodiment the system further comprises a classifier training module which is configured to train the classifier from the feature vectors which have been generated from the text source(s). Preferably, the text source(s) comprises text data that has been pre-labelled with at least one representative category. The classifier may be a timed aggregate perceptron classifier. The classifier is preferably configured to generate a confidence vector relating to the at least one category.

In a preferred embodiment, the weighting module is configured to generate a weights vector from the confidence vector. Preferably, the weighting module generates the weights vector by setting the largest positive value in the confidence vector to 1, and dividing all other positive values in the confidence vector by the largest positive value in the confidence vector multiplied by a constant factor, and by setting any negative confidence value to zero. The weighting module may be configured to scale the text predictions generated by the text prediction engine by the weights vector to generate the new text predictions.

Preferably, the weighting module is configured to insert the new text predictions into a multimap structure, the structure comprising text predictions mapped to probability values, and to return the p most probable new text predictions.

The at least one predictor may be one of a single language model, a multi-language model or an adaptive prediction system. The text prediction engine may comprise at least two predictors, at least one of which is an adaptive prediction system. In this embodiment, the at least one adaptive prediction system comprises a second text prediction engine comprising at least one predictor and configured to receive the input text and to generate text predictions using the at least one predictor, a second classifier configured to receive the input text and to generate at least one text category prediction, a second weighting module configured to receive the text predictions from the second text prediction engine and the at least one category prediction from the second classifier and to weight the text predictions by the category predictions to generate new text predictions.

Preferably, the computing device is one of a mobile phone, a PDA or a computer such as a desktop PC, a laptop, a tablet PC, a Mobile Internet Device, an Ultramobile PC, a games console, or an in-car system.

The present invention also provides a method of generating text predictions from user text input, the method comprising generating text predictions based upon user text input, generating, based upon the user text input, a set of text category predictions, generating, a set of category-weighted text predictions, and presenting the set of category-weighted text predictions to the user. Preferably, the method further comprises selecting one of the set of category-weighted text predictions for text input.

The predictions are generated by at least one predictor and the method preferably comprises training the at least one predictor based upon a text source. In an embodiment comprising a plurality of predictors, each predictor is trained based upon a separate text source. Preferably, predictions are generated concurrently by the plurality of predictors.

In an embodiment, the method further comprises generating a feature vector representing the text input into the device by a user by extracting features from the text input, calculating the term frequency-inverse document frequency for each term in the text input, and normalising the resulting vector to unit length. Preferably, the method also comprises generating at least one feature vector for the text source or each of the separate text sources by extracting a set of features from the text source, calculating the term frequency-inverse document frequency for each feature in the text source, and normalising the resulting vectors to unit length.

Preferably, the text category predictions are generated by a classifier. The classifier may be a timed aggregate perceptron classifier. Preferably, the method comprises training the classifier based upon the feature vector generated from the text source(s). Preferably, the text source(s) comprises text data that has been pre-labelled with at least one representative category.

In an embodiment, the method comprises inserting the category-weighted text predictions into a multimap structure, the structure comprising category-weighted text predictions mapped to probability values, and returning the p most probable category-weighted text predictions.

The step of generating the set of text category predictions may comprise generating a confidence vector relating to the categories. The step of generating the set of text category-weighted predictions may comprise generating a weights vector from the confidence vector. The weights vector may be generated by setting the largest positive value in the confidence vector to 1, and dividing all other positive values in the confidence vector by the largest positive value in the confidence vector multiplied by a constant factor, and by setting any negative confidence value to zero. The step of generating the set of category-weighted predictions may comprise scaling the text predictions generated by the text prediction engine by the weights vector.

In an embodiment, the step of generating text predictions comprises generating text predictions using at least two predictors. Preferably, generating text predictions using at least one of the at least two predictors comprises generating text predictions based upon the user text input, generating a second set of text category predictions and generating a set of new text predictions by weighting the text predictions from the second predictor by the second set of category predictions.

The present invention will now be described in detail with reference to the accompanying drawings, in which.

The present invention provides a modular language model based text prediction system for the adaptive weighting of text prediction components. The system (named an adaptive predictor) utilises a machine learning technique, classification, which is trained on text data that has been pre-labelled with representative categories, and makes real-time category predictions for sections of text entered by a user.

As stated above, the real-time category predictions for sections of user-entered text are used by the system to reorder text predictions that have been generated by the system from the user inputted text. The system is therefore capable of placing the most probable predictions (based on local context, category predictions and information about the current word, if there is one) at the top of a list of text predictions generated for display and user selection, thereby facilitating user selection and text input.

The present system can be employed in a broad range of electronic devices. By way of non-limiting example, the present system can be used for mobile phone text entry, for text input into a PDA device, or for computer text entry (for example, where a key stroke and means of scrolling can be used to select the relevant prediction or where the device employs touch screen technology).

The classifier can be predominately focussed in a specialised topic/genre/authorship, etc., to facilitate text input for that given topic/genre/authorship, etc. For example, a classifier focussed on the topic of sport can comprise many subcategories within sport. A system comprising such a classifier can be used by a sports journalist to facilitate text input (i.e. in the form of an email or word processing document). Similarly, the system of the present invention could be used in companies or organisations where there is a specialist type of language used (e.g. for legal, financial, or business documents), the classifier being trained on many text sources in that field.

Figure 1:
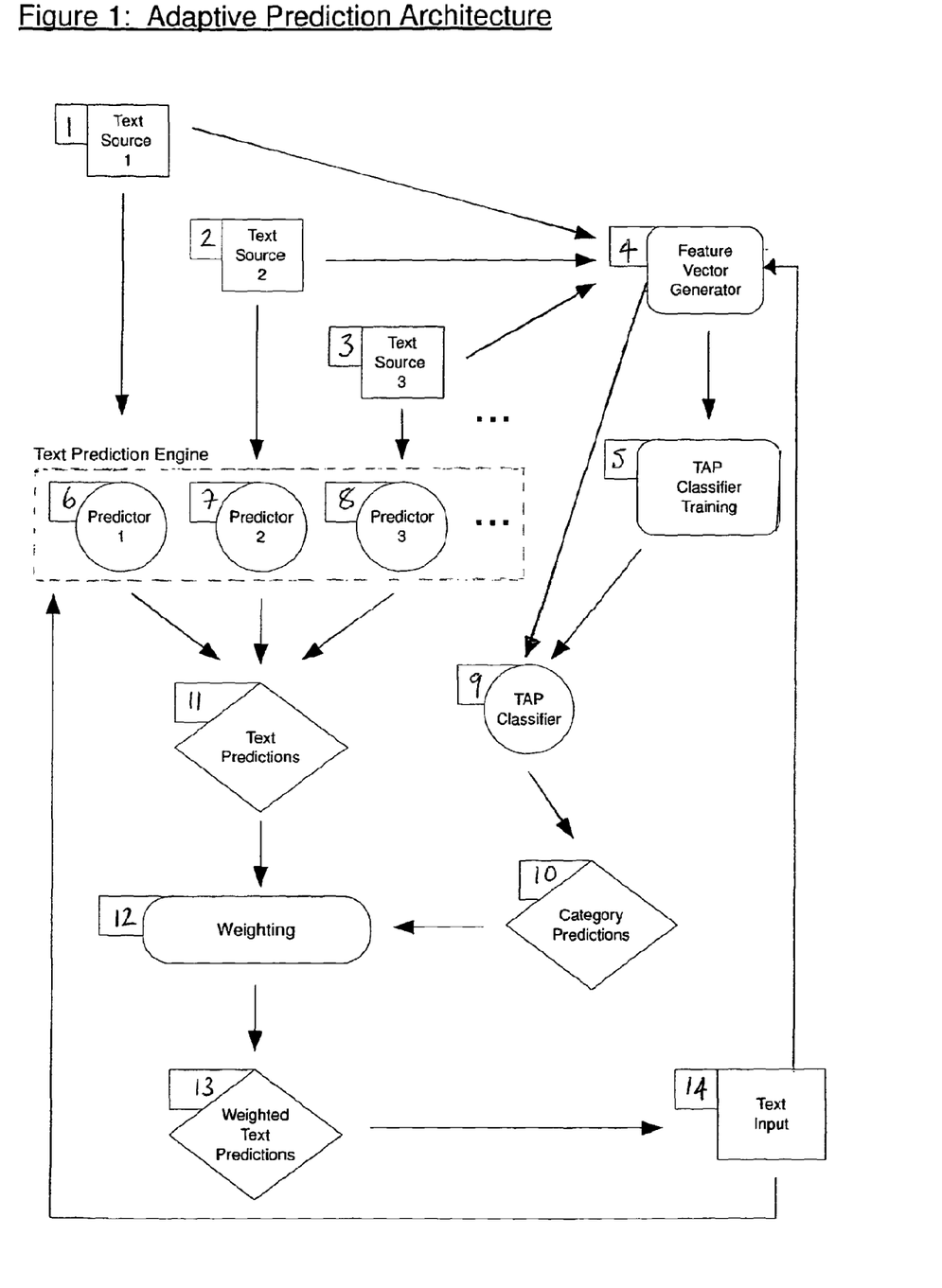
FIG. 1 is a schematic of an adaptive prediction architecture according to the invention.

The system of the present invention is schematically shown in FIG. 1. The elements of the system will now be described with reference to this figure.

The system comprises a plurality of text sources 1, 2, 3, each text source comprising at least one, and preferably a plurality of, documents. Each text source 1, 2, 3 is a body of electronic text for which there exists a category label referring to some aspect of the nature of the text. The category label could refer to a particular language, to a particular topic (e.g. sport, finance etc.), to a particular genre (e.g. legal, informal, etc.), to a particular author, to a particular recipient or set of recipients, to a particular semantic orientation, or to any other attribute of the text that can be identified. The text sources are used to train one or more predictors 6, 7, 8 and a classifier 9.

The system comprises a text prediction engine 100 which includes at least one predictor 6, 7, 8. A predictor can be any prediction component that generates one or more text predictions. Any prior art predictor can therefore be incorporated into the present system. Preferably, the predictor generates text predictions based on the context of the user inputted text, i.e. the predictor generates text predictions for the nth term, based on n-1 terms of context. Each predictor can be one of a single language model, a multi-language model (where a multi-language model combines predictions sourced from multiple language models to generate a set of predictions), an adaptive prediction model of the type schematically described in FIG. 1, or any other type of language model. Each predictor 6, 7, 8 is trained by a text source 1, 2, 3, where each text source is used to train a separate predictor. The system can utilise an arbitrary number of text sources. A predictor returns text predictions 11 as a set of terms/phrases mapped to probability values. A thorough description of the use of a predictor (single and multi-language model) to generate text predictions is presented in international patent application PCT/GB2010/000622, claiming priority from UK patent application number 0905457.8, "System and method for inputting text into electronic devices", which is incorporated herein by reference in its entirety. A further thorough description of the use of a predictor (multi model) to generate text predictions is presented in UK patent application number 1016385.5, "System and method for inputting text into electronic devices", which is incorporated herein by reference in its entirety.

User inputted text 14 is input into the system. The user inputted text comprises the sequence of text entered by the user from the beginning of the current document up to the current position of the cursor. The raw text 14 is input directly into the prediction engine 100 which utilises information about the current, partially-completed term, as well as preferably the context. The raw text is also input into a Feature Vector Generator 4.

The system comprises a Feature Vector Generator 4 which is configured to convert the context terms of the user inputted text 14 (excluding the partially-complete current word) into a feature vector ready for classification. The Feature Vector Generator is also used to generate the feature vectors used to train the classifier (from the text sources). Feature vectors are D-dimensional real-valued vectors $R^D$. Each dimension represents a particular feature used to represent the text. Features are typically individual terms or short phrases (n-grams). Individual term features are extracted from a text sequence by tokenising the sequence into terms (where a term denotes both words and additional orthographic items such as punctuation) and discarding unwanted terms (e.g. terms that have no semantic value such as 'stopwords'). In some cases, features may also be case-normalised, i.e. converted to lowercase. N-gram features are generated by concatenating adjacent terms into atomic entities. For example, given the text sequence "Dear special friends", the individual term features would be: "Dear", "special" and "friends", while the bigram (2-gram) features would be "Dear_special" and "special_friends".

The value D of the vector space is governed by the total number of features used in the model, typically upwards of 10,000 for a real-world classification problem. The Feature Vector Generator 4 is configured to convert a discrete section of text (e.g. an individual document/email etc.) into a vector by weighting each cell according to a value related to the frequency of occurrence of that term in the given text section, normalised by the inverse of its frequency of occurrence across the entire body of text. The formula for carrying out this weighting is known as TF-IDF, and stands for term frequency-inverse document frequency. It is defined as:

$$TF\text{-}IDF(t) = \frac{tf(t)}{df(t)}$$

where tf(t) is the number of times term t occurs in the current document (or email, etc.), and df(t) is the number of documents in which t occurs across the whole collection, i.e. all text sources. Each vector is then normalised to unit length by the Feature Vector Generator 4.

The Feature Vector Generator 4 is configured to split user inputted text into features (typically individual words or short phrases) and to generate a feature vector from the features. The feature vector is passed to a classifier (which uses the feature vector to generate category predictions).

The system comprises a classifier 9. The classifier 9 is trained by a training module 5 using the text sources 1, 2, 3, passed through the Feature Vector Generator 4. The classifier is therefore trained by a body of electronic text which has been pre-labelled with representative categories and converted into a plurality of feature vectors. A trained classifier 9 takes as input a feature vector that has been generated by a Feature Vector Generator from sections of text received from a user 14, and yields category predictions 10, comprising a set of categories mapped to probability values, as an output. The category predictions 10 are drawn from the space of categories defined by the labels on the text sources 1, 2, 3. The present classifier is based on the batch perceptron principle where, during training, a weights vector is updated in the direction of all misclassified instances simultaneously, although any suitable classifier may be utilised. The classifier is preferably a timed aggregate perceptron (TAP) classifier 9. The TAP classifier 9 is natively a binary (2-class) classification model. To handle multi-class problems a one-versus-all scheme is utilised, in which a classifier is trained for each category against all other categories. For example, given the three categories of Sport, Finance and Politics, three individual TAP classifiers would be trained:

1) Sport vs. Finance and Politics
2) Finance vs. Sport and Politics
3) Politics vs. Sport and Finance A classifier training module 5 carries out the training process as already mentioned. The training module 5 yields a weights vector for each classifier, which can be denoted by:

1) Sport: $\hat{w}_S$
2) Finance: $\hat{w}_F$
3) Politics: $\hat{w}_P$

Given a set of N sample vectors of dimensionality D, paired with target labels $(x_i, y_i)$ the TAP training procedure returns an optimized weights vector $x \in \mathbb{R}^D$. The prediction for a new sample $x \in \mathbb{R}^D$ is given by:

$$f(x) = \text{sign}(\hat{w} \cdot x) \qquad (1)$$

where the sign function converts an arbitrary real number to +/−1 based on its sign. The default decision boundary lies along the unbiased hyperplane $\hat{w} \cdot x = 0$, though a threshold can easily be introduced to adjust the bias.

The class-normalised empirical loss at training iteration t falls within the range (0,1) and is defined by:

$$L_t = \frac{1}{2}\left[\frac{|Q_t^+|}{N^+} + \frac{|Q_t^-|}{N^-}\right] \qquad (2)$$

where $Q_t$ denotes the set of misclassified samples at the $t^{th}$ training iteration, N denotes the total number of training samples in a given class, and +/− denotes class specificity. The misclassification condition is given by:

$$w_t x_i y_i < 1 \qquad (3)$$

A margin of +/−1 perpendicular to the decision boundary is required for correct classification of training samples.

At each iteration, an aggregate vector $a_t$ is constructed by summing all misclassified samples and normalising:

$$a_t = \text{norm}(\Sigma_{x_i \in Q_t} x_i y_i, T) \qquad (4)$$

where norm (v,T) normalises v to magnitude T and $Q_t$ is the set of misclassified samples at iteration t, with The timing variable T is set to 1 at the start of the procedure and gradually diminishes, governed by the following expression:

$$T_t = T_{t-1} - \begin{Bmatrix} r-1 & L_{t-1} > L_t \\ rt(L_t - L_{t-1})b & \text{otherwise} \end{Bmatrix} \quad (5)$$

r is the timing rapidity hyperparameter and can be manually adjusted to tune the performance of the classifier. Its default value is 1. b is a measure of the balance of the training distribution sizes, calculated by:

$$b = \frac{\min(N^+, N^-)}{N} \quad (6)$$

with an upper bound of 0.5 representing perfect balance. Termination occurs when either the timing variable or the empirical loss reaches zero. How well the TAP solution fits the training data is governed by the rapidity of the timing schedule; earlier stopping leads to a more approximate fit.

In the present invention, preferably, a modified form of the classification expression (1) is used without the sign function to yield a confidence value for each classifier, resulting in an M-dimensional vector of confidence values, where M is the number of categories. So, for instance, given a new, unseen text section represented by vector $x \in \mathbb{R}^D$ the following confidence vector $c \in \mathbb{R}^M$ would be generated:

$$c = \begin{pmatrix} \hat{w}_S \cdot x \\ \hat{w}_F \cdot x \\ \hat{w}_P \cdot x \end{pmatrix}$$

To optimise the performance of the TAP classifier 9 on a particular dataset, the timing rapidity hyperparameter r is experimentally tuned.

The system further comprises a weighting module 12. The weighting module 12 uses the category predictions 10 generated by the classifier 9 to weight text predictions 11 generated by the text prediction engine 100. The weight assigned to predictions 11 from each predictor 6, 7, 8 is governed by the distribution of confidence values assigned by the classifier 9. The weighting module 12 uses the vector of confidence values generated by the classifier 9 to weight predictions 11 from the respective prediction components 6, 7, 8 to generate category-weighted predictions 13.

A particular weighting module 12 may reside within an adaptive predictor that exists at an upper level in a hierarchical prediction structure (as discussed later), and the probabilities that are output may be involved in an arbitrary number of subsequent comparisons. Consequently, it is important that the weighting module 12 respects the absolute probabilities assigned to a set of predictions, so as not to spuriously skew future comparisons. Thus, the weighting module 12 always leaves predictions 11 from the most likely prediction component unchanged, and down-scales less likely components proportionally.

Using the confidence vector obtained from the classifier 9, the weighting module 12 constructs a corresponding M-dimensional weights vector which is used to scale the predictions 11 from the M prediction components.

In the TAP model, the decision boundary for class membership is 0. Thus, if a particular cell in the confidence vector is negative, it is an indication that the classifier has assigned low likelihood to the hypothesis that the text is of that category. In this case, the corresponding cells in the weights vector are set to 0. In practice, predictions from components with zero-valued weights will be effectively filtered out.

The element of the weights vector that corresponds to the highest positive valued confidence element is assigned a weight of 1, and the remaining weights are scaled relative to the differences between the positive confidence values.

The algorithm for constructing a weights vector from a confidence vector is as follows:

For each positive confidence value $c_i$ and corresponding weights value $w_i$:

if $c_i < 0$ then $w_i = 0$ else $w_i = \dfrac{c_i}{\max\limits_k [c_k]}$

For instance, using the above 3-class example, the following confidence vector:

$$c = \begin{pmatrix} 0.41 \\ -0.62 \\ 1.83 \end{pmatrix}$$

would be converted into the following weights vector:

$$w = \begin{pmatrix} 0.22 \\ 0 \\ 1 \end{pmatrix}$$

If required, a constant can be introduced to increase the prevalence of the most likely component in relation to the others. Weights are then calculated using:

$$w_i = \frac{c_i}{v \cdot \max\limits_k [c_k]}$$

This applies to all positive confidence values except for the highest. The value of v is chosen manually. Continuing the above example, using v=3 would result in the following weights vector:

$$w = \begin{pmatrix} 0.07 \\ 0 \\ 1 \end{pmatrix}$$

The weighting module 12 scales the predictions 11 from each of the constituent prediction components according to the values in the corresponding cells of the weights vector, to generate a set of category-weighted text predictions. The weighting module 12 is configured to insert the category-weighted text predictions into a 'multimap' structure to return the p most probable terms as the final text predictions 13. A multimap is a map or associative array in which more than one value may be associated with and returned from a given key.

In the present invention, preferably, the multimap is an STL multimap in which an associative key-value pair is held in a binary tree structure, in which duplicate keys are allowed. The multimap can be used to store a sequence of elements as an ordered tree of nodes, each storing one element. An element consists of a key, for ordering the sequence, and a mapped value. In the STL multimap of the present system, a prediction is a string value mapped to a probability value, and the map is ordered on the basis of the probabilities, i.e. the probability values are used as keys in the multimap and the strings as values.

By way of example, given the category-weighted predictions "a"→+0.2 and "the"→0.3 from weighting the text predictions generated by the first predictor, and the category-weighted predictions "an"→0.1 and "these"→0.2 from weighting text predictions generated by a second predictor, the weighting module inserts these weighted predictions into a multimap ((0.1→"an"), (0.2→"a"), (0.2→"these"), (0.3→"the")), which is then read in reverse to obtain a set of final predictions.

The final predictions 13 generated by the weighting module 12 can be outputted to a display of the system for user selection, to input text into an electronic device. The selected prediction is then part of the user inputted text 14 used to generate a new set of predictions 13 for display and user selection.

In general, but not exclusive terms, the system of the invention can be implemented as shown in FIG. 1. FIG. 1 is a block diagram of an adaptive prediction architecture according to the invention. A user inputs text 14 into the system. This text input 14 is passed to the text prediction engine 100 and to the Feature Vector Generator 4. The Feature Vector Generator 4 converts the user inputted text 14 into a feature vector and passes this feature vector to the classifier 9.

The text prediction engine 100 generates, using at least one predictor, at least two text predictions 11 based on the input text 14. In the case of a predictor being a multi-language model, the predictions from each of the language models (within the multi-language model) are combined by inserting the predictions into an STL multimap structure and returning the p most probable values. The resulting set of text predictions 11 is passed to the weighting module 12.

The TAP classifier 9 uses the feature vector to generate M category predictions 10 (which comprises an M-dimensional confidence vector, where there are M categories represented in the pre-labelled text sources). The category predictions are passed to the weighting module 12.

The weighting module 12 generates an M-dimensional weights vector from the M-dimensional confidence vector of the category predictions 10 and uses the weights vector to scale the text predictions 11 from the M predictors of the text prediction engine, thereby generating category-weighted text predictions. The category-weighted text predictions are inserted, by the weighting module, into a multimap and the p most probable predictions 13 are returned to the user of the system for selection and text input.

The predictions can be displayed in a list format, with the most probable term at the top or end of the list. A prediction that is selected by the user for input into the system becomes the next section of user inputted text 14. The system uses this inputted text 14, preferably along with one or more previously inputted text sections, to generate new text predictions 13 for user display and selection.

Figure 2:
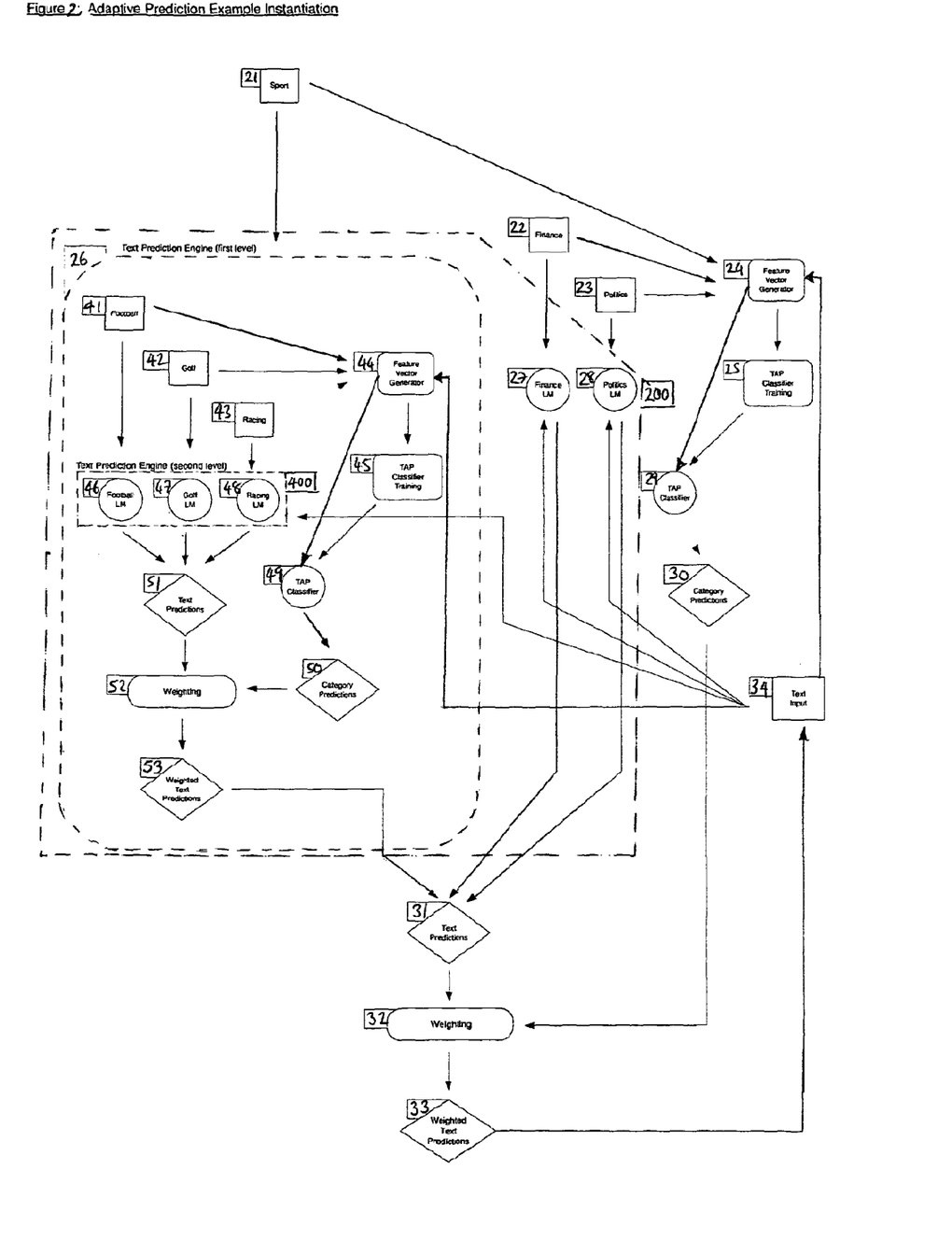
FIG. 2 is a schematic of an example instantiation of the adaptive predictive architecture according to the invention.

As explained above, a predictor 6, 7, 8 can be an adaptive predictive system, such as that described in FIG. 1. The present system therefore defines a recursive framework that allows an arbitrary number of adaptive predictors to be structured in hierarchy. Such an example is now described with reference to FIG. 2. FIG. 2 schematically shows the adaptive prediction architecture of claim 1, where one of the predictors 26, 27, 28 of the text prediction engine 200 is an adaptive predictor 26. Each of the predictors 46, 47, 48 within this adaptive predictor 26 can be a single language model, a multi-language model or an adaptive prediction model. Thus, the adaptive prediction architecture defines a recursive framework that allows an arbitrary number of adaptive predictors to be structured in hierarchy.

FIG. 2, which schematically describes an example of a two-level adaptive prediction hierarchy, is for illustrative purposes only. It is one of an infinite number of potential structures within the adaptive prediction framework according to the invention.

At the first level, three text sources 21, 22, 23 are used, representing three topics: sport, finance and politics. These sources and their respective categories are passed through the Feature Vector Generator 24 to the TAP training module 25 to yield a 3-class TAP classifier 29. The text sources 22, 23 representing the finance and politics categories are used to train single language models 27, 28 while the text source representing sport 21 is used to train an adaptive predictor 26.

Within the adaptive predictor 26, the sport text source is split into three sub-categories: football 41, golf 42 and racing 43. These are passed through a second-level Feature Vector Generator 44 to the second-level TAP classifier training module 45 to produce a second 3-class TAP classifier 49. Additionally, each sub-category text source 41, 42, 43 is used to train a respective single language model 46, 47, 48.

The user text input 34 is passed to both first-level 29 and second-level 49 TAP classifiers to generate first-level 30 and second-level 50 category predictions. The first-level category predictions 30 are used by the first-level weighting module 32 to weight the predictions 33 generated by the first-level prediction engine 200, whilst the second-level category predictions 50 are used by the second-level weighting module 52 to weight predictions 51 from the second-level prediction engine 400.

The second-level category-weighted predictions 53 are treated as a set of text predictions from a first-level prediction component 26 of a first-level prediction engine 200. The second-level category-weighted predictions 53 are therefore scaled (by the first-level weighting module 32) using a first-level weights vector (based on first-level category predictions 30).

Figure 3:
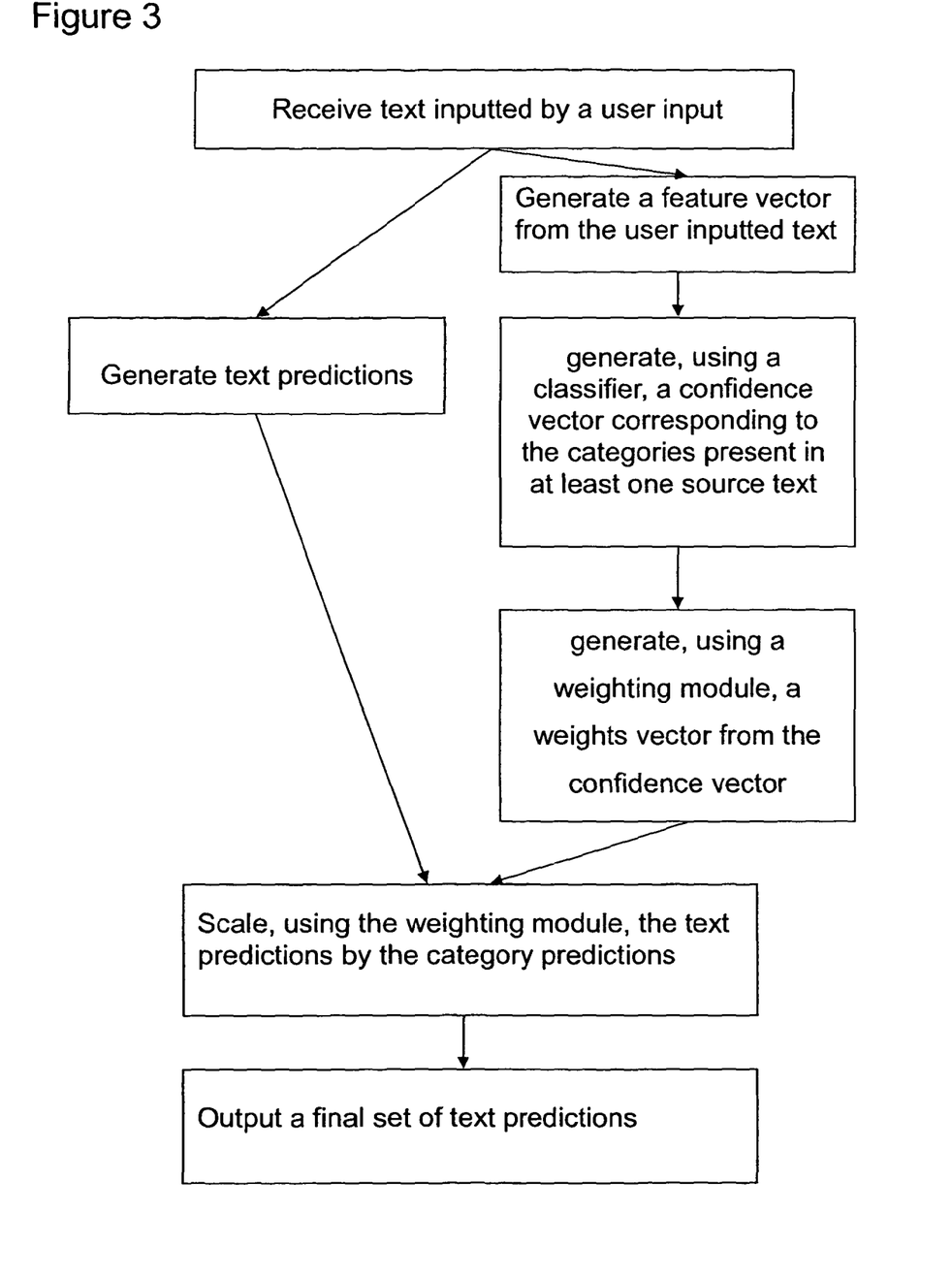
FIG. 3 is a schematic of a method for generating category-weighted text predictions according to the invention.

A method according to the present invention is now described with reference to FIG. 3 which is a flow chart of a method for processing user text input and generating category weighted text predictions. In the particular method described, the first step comprises receipt of user text input 14 and the generation of text predictions 11 from the user inputted text 13. The method further comprises the formatting of the user inputted text by a Feature Vector Generator 4 which converts the text into a feature vector. The method comprises generating, using a classifier 9, a confidence vector relating to the categories present in pre-labelled source text(s) 1, 2, 3. The method further comprises generating, using a weighting module 12, a weights vector from the confidence vector and scaling (using the weighting module) the text predictions 11 by the weights vector to generate a final set of text predictions 13. If the predictors 6, 7, 8 and classifier 9 have not been trained, the method further comprises training at least one predictor and a classifier from at least one source text.

The method for producing a set of weighted output text predictions is now described in greater detail with reference to FIG. 2 and a specific scenario. It is assumed that both TAP classifiers 29, 49 have been trained using the relevant text sources 21, 22, 23, 41, 42, 43 and likewise that the language models 26, 27, 28, 46, 47, 48 have also been trained.

By way of an example, say a user has entered the following sequence 34:

"Today's match was a classic local derby. The visitors were clearly motivated following the recent takeover of the club by the AEG group. The first"

This input text 34 is passed to the first-level text prediction text engine 200 and the second-level text prediction engine 400 to generate first-level text predictions 31 and second-level text predictions 51. The input text 34 is also passed to both the first-level TAP classifier 29 and the second-level TAP classifier 49 after being preprocessed into the TAP input format described above. Each classifier 29, 49 yields a three-element confidence vector. The input text 34 is also passed to the first-level text prediction text engine 200 and the second-level text prediction engine 400 to generate first-level text predictions 31 and second-level text predictions 51.

In the present example, the first-level classifier 29 distinguishes between the categories sport, finance and politics, and would yield a first-level confidence vector, such as the following:

$$c_1 = \begin{pmatrix} 1.41 \\ 0.52 \\ -0.83 \end{pmatrix}$$

where the first element corresponds to sport, the second to finance, and the third to politics. This would be converted into the following first-level weights vector by the first-level weighting module (in according to the procedure described above):

$$w_1 = \begin{pmatrix} 1 \\ 0.37 \\ 0 \end{pmatrix}$$

The second-level classifier 49 distinguishes between the sub-categories football, golf and racing, and would yield a second-level confidence vector such as the following:

$$c_2 = \begin{pmatrix} 1.2 \\ 0.31 \\ 0.09 \end{pmatrix}$$

where the first element corresponds to football, the second to golf, and the third to racing. This would be converted into the following second-level weights vector (using the second-level weighting module):

$$w_2 = \begin{pmatrix} 1 \\ 0.26 \\ 0.08 \end{pmatrix}$$

Given a target prediction set size of three terms, the finance and politics first level predictors would yield predictions 31 such as the following (bearing in mind the local context—"The first"):

$$\text{finance:} \begin{pmatrix} (\text{quarter}, 0.25) \\ (\text{accounting}, 0.1) \\ (\text{merger}, 0.05) \end{pmatrix}$$

$$\text{politics:} \begin{pmatrix} (\text{term}, 0.15) \\ (\text{constituent}, 0.1) \\ (\text{vote}, 0.02) \end{pmatrix}$$

while the sport constituent (adaptive predictor) would yield three sets of internal predictions 51, one for each sub-category:

$$\text{football:} \begin{pmatrix} (\text{half}, 0.22) \\ (\text{goal}, 0.15) \\ (\text{tackle}, 0.05) \end{pmatrix}$$

$$\text{golf:} \begin{pmatrix} (\text{hole}, 0.25) \\ (\text{round}, 0.2) \\ (\text{birdie}, 0.04) \end{pmatrix}$$

$$\text{racing:} \begin{pmatrix} (\text{lap}, 0.2) \\ (\text{incident}, 0.18) \\ (\text{position}, 0.05) \end{pmatrix}$$

These sub-category predictions 51 are then weighted according to the second-level weights vector $w_2$ above to yield:

$$\text{football:} \begin{pmatrix} (\text{half}, 0.22 \cdot 1 = 0.22) \\ (\text{goal}, 0.15 \cdot 1 = 0.15) \\ (\text{tackle}, 0.05 \cdot 1 = 0.05) \end{pmatrix}$$

$$\text{golf:} \begin{pmatrix} (\text{hole}, 0.25 \cdot 0.26 = 0.07) \\ (\text{round}, 0.2 \cdot 0.26 = 0.05) \\ (\text{birdie}, 0.04 \cdot 0.26 = 0.01) \end{pmatrix}$$

$$\text{racing:} \begin{pmatrix} (\text{lap}, 0.2 \cdot 0.08 = 0.02) \\ (\text{incident}, 0.18 \cdot 0.08 = 0.01) \\ (\text{position}, 0.05 \cdot 0.08 = 0.004) \end{pmatrix}$$

The first level weights vector $w_1$ is applied to the predictions from the three first-level prediction components to yield the following:

$$\text{football:} \begin{pmatrix} (\text{half}, 0.22) \\ (\text{goal}, 0.15) \\ (\text{tackle}, 0.05) \end{pmatrix}$$

$$\text{golf:} \begin{pmatrix} (\text{hole}, 0.07) \\ (\text{round}, 0.05) \\ (\text{birdie}, 0.01) \end{pmatrix}$$

$$\text{racing:} \begin{pmatrix} (\text{lap}, 0.02) \\ (\text{incident}, 0.01) \\ (\text{position}, 0.004) \end{pmatrix}$$

$$\text{finance:} \begin{pmatrix} (\text{quarter}, 0.09) \\ (\text{accounting}, 0.04) \\ (\text{merger}, 0.02) \end{pmatrix}$$

$$\text{politics:} \begin{pmatrix} (\text{term}, 0) \\ (\text{constituent}, 0) \\ (\text{vote}, 0) \end{pmatrix}$$

The weighting module inserts the weighted text predictions into an STL 'multimap' structure to return the three most probable terms (where p=3) as the final weighted text predictions 33:

$$\begin{pmatrix} (\text{half}, 0.22) \\ (\text{goal}, 0.15) \\ (\text{quarter}, 0.09) \end{pmatrix}$$

The final predictions 13 are outputted to a display of the system for user selection, to input text 14 into an electronic device. The predicted term selected by the user is input into the electronic device and is used by the system to predict a further set of text predictions 13 for display and user selection.

It will be appreciated that this description is by way of example only; alterations and modifications may be made to the described embodiment without departing from the scope of the invention as defined in the claims.

The invention claimed is:

1. A system for generating text input, the system comprising:
   a processor; and
   memory storing instructions that, when executed by the processor, configure the processor to:
   receive a text input;
   generate, using at least two predictors, a plurality of text predictions from each predictor based on the text input, wherein each of the plurality of text predictions is a word or phrase mapped to a probability value;
   generate, using a classifier, at least two text category predictions based on the text input, wherein each text category prediction comprises a category mapped to a probability value;
   weight, using a weighting module, the probabilities of the plurality of text predictions from each predictor by the probability of a corresponding category prediction to generate a plurality of category-weighted text predictions;
   determine the n most probable category-weighted text predictions; and
   output the n most probable category-weighted text predictions for presentation to a user.

2. The system of according to claim 1, wherein the at least two predictors comprise a plurality of predictors, each of the plurality of predictors trained by a separate text source.

3. The system according to claim 2, further comprising instructions that, when executed by the processor, configure the processor to generate a feature vector representing the text input by extracting features from the input text, calculating the term frequency-inverse document frequency for each feature in the input text, and normalising the resulting vector to unit length.

4. The system according to claim 1, wherein the instructions configure the processor to generate a feature vector for a category by extracting a set of features from a text source associated with the category, calculating the term frequency-inverse document frequency for each feature in the text source, and normalising the resulting vectors to unit length.

5. The system according to claim 4, further comprising instructions that, when executed by the processor, configure the processor to train the classifier on a plurality of feature vectors for a plurality of categories.

6. The system according to claim 1, wherein the classifier is configured to generate a confidence vector relating to each of the at least two categories.

7. The system according to claim 6, wherein the weighting module is configured to generate a weights vector from the confidence vector by setting a largest positive value in the confidence vector to 1, and dividing all other positive values in the confidence vector by the largest positive value in the confidence vector multiplied by a constant factor, and by setting any negative confidence value to zero.

8. The system according to claim 7, wherein the weighting module is configured to scale the text predictions generated by the text prediction engine by the weights vector to generate the subset of text predictions.

9. The system according to claim 1, at least one of the at least two predictors comprises an adaptive prediction system.

10. The system according to claim 9, wherein the at least one adaptive prediction system comprises:
    at least one additional predictor;
    a second classifier;
    a second weighting module; and
    instructions that, when executed by the processor, configure the processor to:
    receive the input text;
    generate text predictions using the at least one additional predictor and the text input;
    generate, using the second classifier, at least one text category prediction based on the text input; and
    weight, using the second weighting module, the text predictions from the at least one additional predictor by the at least one category prediction from the second classifier to generate new text predictions.

11. A method of generating text predictions, comprising;
    receiving a text input;
    generating using at least two predictors a plurality of the text predictions from each predictor based upon the text input, wherein each of the plurality of text predictions is a word or phrase mapped to a probability value;
    generating, using a classifier, at least two text category predictions based on the text input and a feature vector for a category, wherein each text category prediction comprises a category mapped to a probability value;
    weighting the probabilities of the plurality of text predictions from each predictor by the probability of a corresponding text category prediction to generate a plurality of category-weighted text predictions;
    determining the n most probable category-weighted text predictions; and
    outputting the n most probable category-weighted text predictions.

12. The method according to claim 11, wherein the text predictions are generated by a plurality of predictors and the plurality of predictors is trained, each predictor being trained based upon a separate text source.

13. The method according to claim 12, further comprising generating a feature vector representing the text input into a device by a user by extracting features from the text input, calculating the term frequency-inverse document frequency for each feature in the text input, and normalising the resulting vector to unit length.

14. The method according to claim 11, further comprising generating a feature vector for a category by extracting a set of features from a text source associated with the category, calculating the term frequency-inverse document frequency for each feature in the text source, and normalising the resulting vectors to unit length.

15. The method according to claim 11, further comprising generating a set of text category predictions based upon the text input and a plurality of feature vectors for a plurality of categories.

16. The method according to claim 15, wherein the method further comprises training, using a processor, the classifier based upon the plurality of feature vectors.

17. The method according to claim 11, wherein the step of generating the at least one text category prediction comprises generating a confidence vector relating to each of the at least two categories.

18. The method according to claim 17, wherein the step of weighting the plurality of text predictions based on the at least one text category prediction comprises generating a weights vector from the confidence vector by setting a largest positive value in the confidence vector to 1, and dividing all other positive values in the confidence vector by the largest positive value in the confidence vector multiplied by a constant factor, and by setting any negative confidence value to zero.

19. The method according to claim 18, wherein the step of weighting the plurality of text predictions based on the at least one text category prediction comprises scaling the text predictions generated by the text prediction engine by the weights vector.

* * * * *